United States Patent
Hall et al.

(10) Patent No.: US 8,139,558 B2
(45) Date of Patent: Mar. 20, 2012

(54) METHOD AND SYSTEM FOR ESTABLISHING A SYSTEM TIME WITHIN A MOBILE AD HOC NETWORK

(75) Inventors: Mark D. Hall, Derby, KS (US);
Timothy M. Force, Douglass, KS (US)

(73) Assignee: The Boeing Company, Chicago, IL (US)

( * ) Notice: Subject to any disclaimer, the term of this patent is extended or adjusted under 35 U.S.C. 154(b) by 885 days.

(21) Appl. No.: 12/114,312

(22) Filed: May 2, 2008

(65) Prior Publication Data
US 2009/0274137 A1    Nov. 5, 2009

(51) Int. Cl.
*H04J 3/06* (2006.01)
(52) U.S. Cl. ............ 370/350; 370/503; 455/502
(58) Field of Classification Search ........... 370/310, 370/324, 345, 350, 503; 455/502
See application file for complete search history.

(56) References Cited

U.S. PATENT DOCUMENTS

| | | | |
|---|---|---|---|
| 6,369,751 B1 * | 4/2002 | Naruse | 342/357.42 |
| 6,654,685 B2 * | 11/2003 | McIntyre | 701/213 |
| 7,710,944 B1 * | 5/2010 | Yoon | 370/350 |
| 2005/0262278 A1 * | 11/2005 | Schmidt | 710/62 |

OTHER PUBLICATIONS

Elliott D. Kaplan, Editor, *Time and GPS, Understanding GPS Principles and Applications, Mobile Communications Series*, 1996, pp. 54-57, Artech House Publishers. Norwood, MA.

* cited by examiner

*Primary Examiner* — Chi Pham
*Assistant Examiner* — Weibin Huang
(74) *Attorney, Agent, or Firm* — Alston & Bird LLP

(57) ABSTRACT

A mobile ad hoc network, a mobile ad hoc network node and a method for establishing a system time within a mobile ad hoc network are provided. The network nodes may include a global positioning system (GPS) receiver for receiving GPS signals and for providing a GPS time derived from the GPS signals. The GPS time may be employed by the network node as the system time. Even though the network nodes of a mobile ad hoc network independently determine the GPS time and, in turn, the system time, the system time will be common for each of the network nodes. Mobile ad hoc network nodes may therefore join and leave the mobile ad hoc network with each network node being able to determine the system time prior to its joinder based upon the GPS time provided by the respective GPS receiver.

18 Claims, 3 Drawing Sheets

METHOD AND SYSTEM FOR ESTABLISHING A SYSTEM TIME WITHIN A MOBILE AD HOC NETWORK

FIELD OF THE INVENTION

Embodiments of the present invention relate generally to mobile ad hoc networks and, more particularly, to methods and systems for establishing a system time within a mobile ad hoc network.

BACKGROUND OF THE INVENTION

Within a computer network having a number of network nodes, a system time is generally defined such that the clock associated with each node can be brought into agreement with, i.e., synchronized, with the system time. For example, a computer network may include a plurality of computer devices networked together with each computer device defining a respective node. As such, a common system time can be provided to each of the computing devices such that the clock of each computing device can be synchronized to the system time. By establishing a common system time within a computer network, communication can be facilitated. For example, data collected by one of the network nodes and provided to other ones of the network nodes can be appropriately correlated and/or fused with other data as a result of the common system time. In this regard, the time at which data is collected by two or more nodes of a computer network will be defined in terms of a common system time and can therefore be appropriately analyzed or otherwise processed in accordance with the common timeframe.

In order to maintain a common system time for each of the plurality of nodes within a computer network, a master clock sync signal is typically broadcast on a periodic basis to all of the network nodes. Upon receipt, the network nodes then set their respective local clocks to be equal to the system clock.

While the use of a master clock sync signal has proven to be generally workable for a relatively fixed computer network having a predefined network architecture and a predetermined number of network nodes, the use of a master clock sync signal has proven to be less advantageous for mobile ad hoc networks. In this regard, mobile ad hoc networks are formed of a collection of network nodes which are permitted to join and leave the mobile ad hoc network in a random manner over time. As such, the mobile ad hoc network does not have a predefined network configuration, but is, instead, continually evolving as various network nodes join and/or leave the mobile ad hoc network. Mobile ad hoc networks generally permit some or all of the network nodes to be mobile and therefore typically rely upon wireless communications between the network nodes, thereby creating the need for network nodes to join the mobile ad hoc network in a random manner as new network nodes become positioned so as to be in communication with the mobile ad hoc network and to leave the mobile ad hoc network in a random manner as the network nodes become positioned in such a manner as to lose communication with the mobile ad hoc network.

The number and variety of mobile ad hoc networks are increasing. By way of one example, a mobile ad hoc network may be comprised of the portable computing devices, such as personal digital assistants (PDAs), mobile telephones, laptop or other portable computers, or the like, carried by a group of people who are in the same vicinity, such as within a meeting room or other venue. As such, the individuals could communicate with one another via their respective computing devices with computing devices joining and leaving the mobile ad hoc network on a random basis as individuals carrying the respective computing devices enter and exit, respectively, the venue. As another example, the computing devices onboard each vehicle positioned at a predefined locale, such as the computing devices onboard each tank or other military vehicle positioned within a particular region, may comprise a network node of a mobile ad hoc network. As such, the computing devices carried by one vehicle could communicate with the computing devices carried by another vehicle via the mobile ad hoc network. As before, network nodes may join or leave the mobile ad hoc network as vehicles carrying computing devices arrive at the locale or exit the locale, respectively.

While the use of a master clock sync signal to set the system time has been workable for fixed network configurations, the disadvantages of a master clock sync signal are accentuated in the context of a mobile ad hoc network in which network nodes are permitted to join and leave the network on a random basis. As a result of network nodes joining an existing mobile ad hoc network at different times, the need to initially establish the system time for a new network node prior to its joinder to the mobile ad hoc network occurs more frequently. Since a master clock sync signal is generally only broadcast periodically to the network nodes, including the nodes that have newly joined the network, it sometimes occurs that a node that has recently joined a mobile ad hoc network must refrain from sending information across the mobile ad hoc network until after the node has received the periodically broadcast master clock sync signal. In instances in which it is desirable for a new node to join a mobile ad hoc network and commence communications with other nodes of the mobile ad hoc network, such a delay in communications with the new node of the mobile ad hoc network can be disadvantageous.

Reliance upon a master clock sync also has other disadvantages. For example, the periodic broadcast of the master clock sync signal disadvantageously adds to the communications burden that must be supported by the mobile ad hoc network. Also, as a result of the flexibility provided by a mobile ad hoc network with respect to the random joinder and exit of nodes to and from the mobile ad hoc network, a mobile ad hoc network that periodically broadcasts a master clock sync signal may experience the departure of the node that has provided the master clock sync signal. In this instance, nodes that thereafter join the mobile ad hoc network will not receive a master clock sync signal and will therefore be out of time synchronization with respect to the other network nodes of the mobile ad hoc network.

Accordingly, it would be desirable to provide an improved technique for establishing a common system time for the network nodes of a mobile ad hoc network. In this regard, it would be desirable to provide an improved technique for defining a common system time for a mobile ad hoc network that permits network nodes to join in a random manner and communicate across the network without delay, but with notice of the common system time.

BRIEF SUMMARY OF THE INVENTION

A mobile ad hoc network, a mobile ad hoc network node and a method for establishing a system time within a mobile ad hoc network are provided according to embodiments of the present invention. In this regard, the mobile ad hoc network nodes may include a global positioning system (GPS) receiver for receiving GPS signals and for providing a GPS time derived from the GPS signals. The GPS time may be employed by the mobile ad hoc network node as the system time. Even though the mobile ad hoc network node of a mobile ad hoc network independently determines the GPS time and, in turn, the system time, the system time will be common for each of the mobile ad hoc network nodes since the system time for each mobile ad hoc network mode is defined by the GPS time. As such, mobile ad hoc network nodes may join and leave the mobile ad hoc network with each mobile ad hoc network node being able to determine the system time at the time of its joinder based upon the GPS time provided by the GPS receiver of the respective node.

According to one embodiment, a mobile ad hoc network is provided which includes a plurality of mobile ad hoc network nodes configured to communicate with one another. Each mobile ad hoc network node includes a transceiver configured to communicate with another network node, at least one computing device in communication with the transceiver and a GPS receiver associated with a respective computing device. The GPS receiver is configured to receive GPS signals and to provide a GPS time derived from the GPS signals to the associated computing device to define the system time. As such, the GPS receiver and the associated computing device of each mobile ad hoc network node are configured to independently define a common system time based upon the GPS time provided by the respective GPS receiver.

The mobile ad hoc network nodes may be configured to randomly join and leave the mobile ad hoc network such that the mobile ad hoc network does not have a predefined network configuration. In this embodiment, the computing device of the mobile ad hoc network node may be configured to define the system time based upon the GPS time provided by the respective GPS receiver prior to joining the mobile ad hoc network. As such, a newly joining network node will be synchronized with the other network nodes prior to its joinder to the mobile ad hoc network without having to await the periodic broadcast of a master clock sync signal.

In accordance with another embodiment, a mobile ad hoc network node is provided which includes a transceiver configured to communicate with another mobile ad hoc network node, such as in a wireless manner; at least one computing device in communication with the transceiver and a GPS receiver associated with a respective computing device. The GPS receiver is configured to receive GPS signals and to provide a GPS time derived from the GPS signals to the associated computing device to thereby define a system time. In one embodiment, the at least one computing device is configured to define the system time based upon the GPS time provided by the respective GPS receiver prior to commencing communications with another mobile ad hoc network node. The associated computing device is also configured to communicate via the transceiver with other mobile ad hoc network nodes in accordance with a system time that is both common between the mobile ad hoc network nodes and also based upon the GPS time provided by the respective GPS receiver.

At least one mobile ad hoc network node may include a plurality of computing devices and a corresponding plurality of GPS receivers associated with respective computing devices. In one embodiment, each mobile ad hoc network node includes a router and transceiver for facilitating communications between the computing devices within the network node and with computing devices of other network nodes. In this regard, the router and the at least one computing device may be configured to communicate in accordance with Internet protocol.

In one embodiment, the transceiver of each mobile ad hoc network node is configured to communicate wirelessly with other mobile ad hoc network nodes. However, the transceiver and the at least one computing device of each mobile ad hoc network node may be configured to communicate with one another via wired communication.

In another embodiment, a method for establishing a system time within a mobile ad hoc network is provided. The method receives GPS signals with a GPS receiver associated with a computing device of a first mobile ad hoc network node. The method also provides a GPS time derived from the GPS signals to the associated computing device to thereby define the system time. The method also permits communication between the computing device of the first mobile ad hoc network node and another mobile ad hoc network node in accordance with a system time that is both common between the mobile ad hoc network nodes and also based upon the GPS time provided by the respective GPS receiver. The communication between the computing device of the first mobile ad hoc network node and other mobile ad hoc network nodes may be conducted in a wireless manner, while providing for wired communication between the computing devices of the first mobile ad hoc network node.

The method of one embodiment permits the mobile ad hoc nodes to randomly join and leave the mobile ad hoc network such that the mobile ad hoc network does not have a predefined network configuration. In this embodiment, the system time may be defined by the computing device of the mobile ad hoc network node based upon the GPS time provided by the respective GPS receiver prior to the respective mobile ad hoc network node joining the mobile ad hoc network.

For one embodiment, each of a plurality of computing devices of the mobile ad hoc network node may independently define a respective system time based upon the GPS time provided by the respective GPS receivers. Communications between the computing devices of the same network node are facilitated with a router, while communications between the computing devices of different network nodes are facilitated with routers and transceivers. In one embodiment, such communication is facilitated by permitting communication between the router and the at least one computing device in accordance with Internet protocol.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present inventions now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
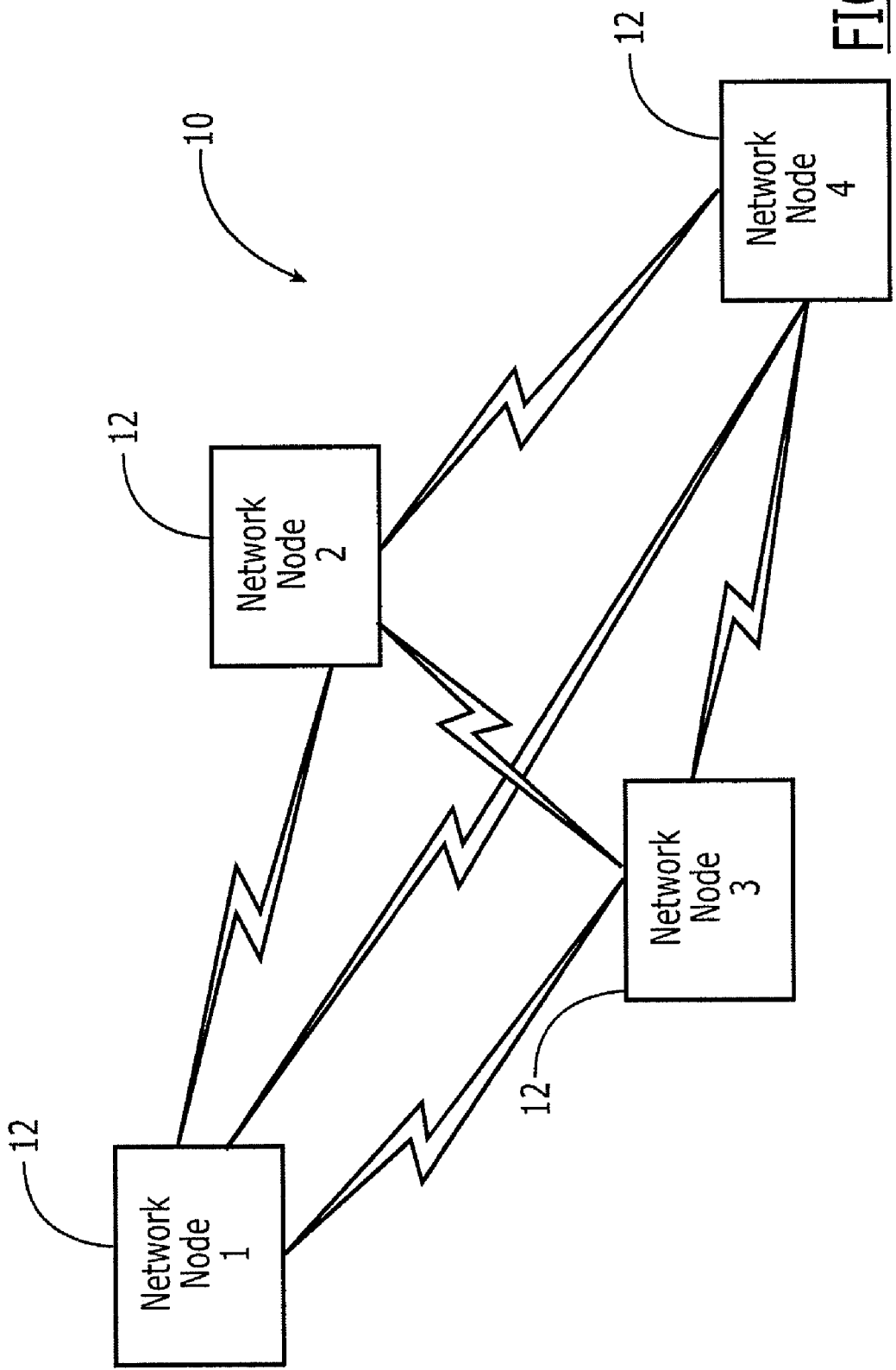
FIG. 1 is a block diagram of a mobile ad hoc network of one embodiment of the present invention.

Referring now FIG. 1, a mobile ad hoc network 10 including a plurality of mobile ad hoc network nodes 12 is depicted. While the illustrated network includes four network nodes, the mobile ad hoc network may have two or more network nodes. As noted above, mobile ad hoc networks are a collection of network nodes that are disposed in communication with one another. However, the network nodes of a mobile ad hoc network are permitted to join and leave the mobile ad hoc network in a random manner over time. As such, the mobile ad hoc network does not have a predefined network configuration. Instead, the mobile ad hoc network evolves over time as various network nodes join and/or leave the network. In order to support the mobility of the network nodes, the network nodes are generally configured to communicate with one another in a wireless manner.

As also noted above, mobile ad hoc networks 10 can be employed in a variety of applications. For example, a mobile ad hoc network may be formed by the computing devices, such as PDAs, mobile telephones, laptop or other portable computers, or the like, carried by a group of people who are in the same vicinity, such as within a meeting room or other venue. As such, the computing devices may be able to communicate with one another via wireless communications established therebetween with computing devices permitted to join and leave the mobile ad hoc network on a random basis as individuals carrying the respective computing devices enter and exit, respectively, the meeting room or other venue. As another example, a mobile ad hoc network may be formed by the computing devices carried by vehicles that are within a common vicinity. For example, the computing devices carried by tanks or other military vehicles that are within the same region may form a mobile ad hoc network with the computing devices onboard each vehicle forming a respective network node 12 that is in wireless communication with the other network nodes. As before, network nodes may randomly join and/or leave the mobile ad hoc network as vehicles arrive within and depart from the region, respectively. As the foregoing examples illustrate, there can be a wide variety of mobile ad hoc networks that are employed for a wide variety of applications.

Figure 2:
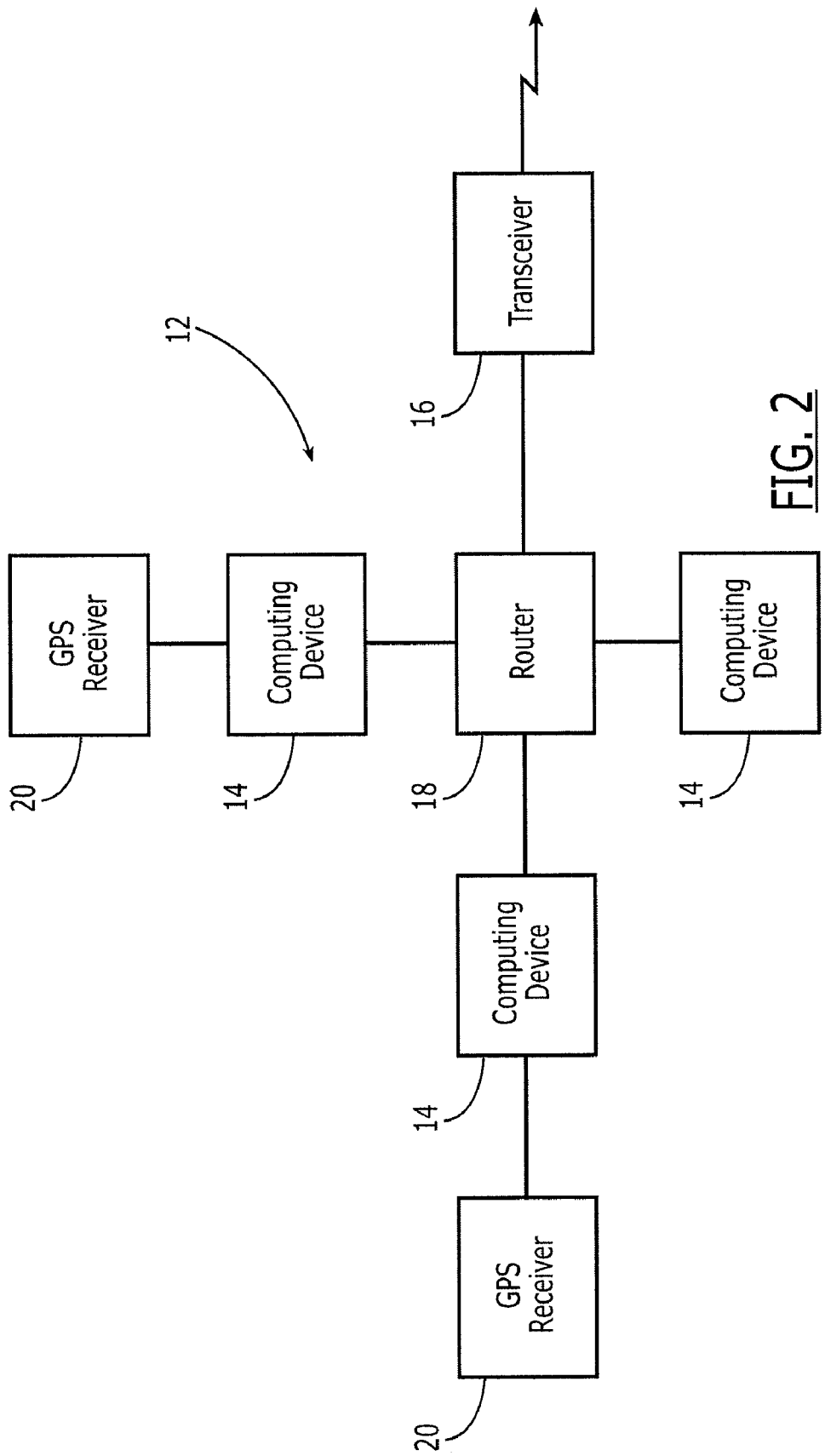
FIG. 2 is a block diagram of a mobile ad hoc network node according to one embodiment to the present invention.

Referring now to FIG. 2, a mobile ad hoc network node 12 according to one embodiment is depicted. As shown, a mobile ad hoc network node includes at least one and, more typically, a plurality of computing devices 14, such as laptop or other types of computers, PDAs, mobile telephones, gaming devices, cameras, sensors, music and/or video players, or the like. As such, the computing devices are not limited to conventional computers, but include a number of other types of electronic devices including or otherwise capable of communicating with a GPS receiver.

Figure 3:
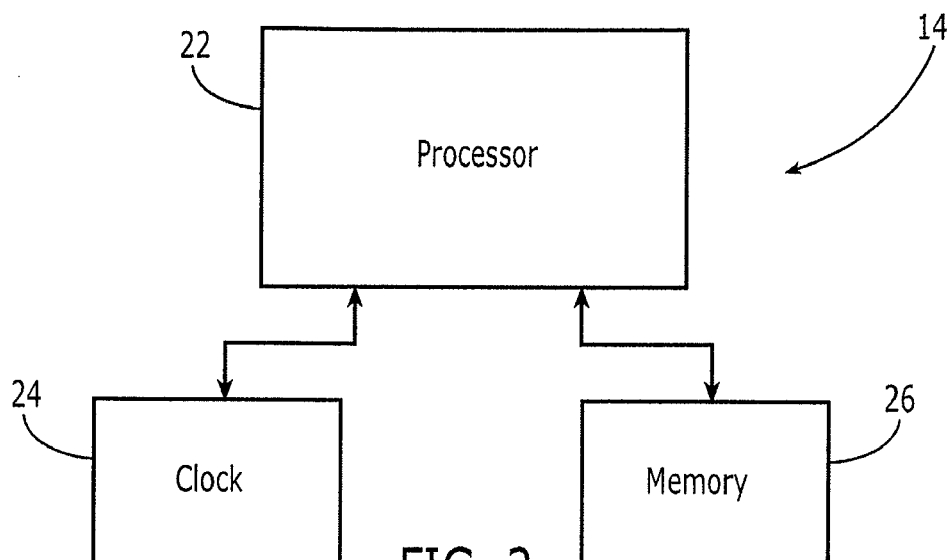
FIG. 3 is a block diagram of a computing device according to one embodiment of the present invention.

As shown in FIG. 3, the computing device 14 of one embodiment includes a processing element 22, such as a processor or controller, and an associated clock 24 and memory device 26. In this regard, the functions performed by the computing device can be performed by the processing element executing a computer program instructions stored by the memory device. The memory device may also store the data in some embodiments. Similarly, the GPS receiver 20 may include a processing element, such as a processor or controller, typically also operating under control of computer program instructions, for receiving and appropriately processing the GPS signals to derive the GPS time provided to the computing device.

The mobile ad hoc network node 12 also generally includes a transceiver 16 for facilitating communications between the computing devices 14 of the network node and the computing devices of another network node within a mobile ad hoc network 10. In this regard, the transceiver is generally configured to wirelessly transmit and receive signals between network nodes of the mobile ad hoc network. Although the computing devices within a network node may also communicate with one another via wireless communications, the computing devices within a network node generally communicate with one another and with the transceiver via a wireline network. Thus, in one embodiment, intranode communication, such as between computing devices and the transceiver of a single node, are conducted via a wired network, while internode communications, such as between respective transceivers of two or more network nodes, are generally conducted via wireless communication techniques.

While the computing devices 14 may be configured to communicate in various manners, a mobile ad hoc network node 12 of one embodiment also includes a router 18 for facilitating communications between the computing devices and the transceiver 16 in accordance with a predefined protocol. The router may be a distinct device or may be embodied by one of the computing devices which includes, for example, software configured to perform the routing functionality. In one embodiment, the router of a mobile ad hoc network node is an Internet Protocol (IP) router configured to route IP messages and other communications between the computing devices of the same network node and between the computing devices of different network nodes, that is, via the transceivers and routers of the respective network nodes. As such, IP addresses may be assigned to each of the computing devices and the transceiver with the router appropriately directing communications between the computing devices and transceiver according to the respective IP addresses.

The mobile ad hoc network node 12 of the illustrated embodiment also includes at least one GPS receiver 20. In this regard, a mobile ad hoc network node generally includes a plurality of GPS receivers, one of which is associated with and in direct communication with a respective computing device 14. A GPS receiver receives signals from one or more GPS satellites, such as at least three of the GPS satellites, and triangulates its position in terms of latitude and longitude to within, for example, 100 meters. In addition to GPS signals that define geographic positions, the GPS signals received by a GPS receiver include signals from which a GPS time can be derived. In this regard, the GPS receiver may derive the GPS time by processing certain GPS signals in a predefined manner. However, the GPS receiver may also derive the GPS time by merely identifying one or more GPS signals from among a plurality of GPS signals which define the GPS time. Therefore, as used herein, GPS time refers to any value or representation of time that is defined by and/or otherwise derivable from the GPS signals received by a GPS receiver associated with a respective computing device.

The GPS receiver 20 is configured to provide the GPS time to the associated computing device 14. Based upon the GPS time, the computing device can set or confirm the system time utilized by the respective computing device. In one embodiment, the computing device includes or is associated with a clock 24 and is configured to set the system time maintained by the clock to be equal to the GPS time provided by the associated GPS receiver. As explained below, in instances in which a network node 12 or a new computing device of an existing network node is in the process of joining a mobile ad hoc network 10, the computing device may initially set the system time employed by the computing device to equal the GPS time provided by the associated GPS receiver. Alternatively, in instances in which the computing device and its respective network node are already members of the mobile ad hoc network, the GPS time provided by the GPS receiver may be employed by the associated computing device to reset or redefine the system time employed by the computing device to equal the GPS time, thereby effectively re-synchronizing the system time employed by the associated computing device. As shown, for example, in FIG. 2, a GPS receiver need not be associated with each computing device of a network node since the system time established by one computing device based upon the GPS time provided by the associated GPS receiver can be provided to the other computing device(s) which do not have associated GPS receiver(s) to correspondingly set the system time of the other computing device(s).

By setting the system time employed by each computing device 14 based upon the GPS time provided by the associated GPS receiver 20, the system time employed by each computing device is set independently of the system time of the computing devices of the other network nodes 12 and, in some embodiments, independent of the system time of the other computing devices within the same network node. By permitting the system time employed by each computing device to be set in an independent manner, the mobile ad hoc network 10 need not require the transmission of a master clock sync signal, thereby decreasing the signaling overhead that must be supported by the network.

Additionally, by permitting the system time employed by each computing device 14 to be set in an independent manner, the system time for a computing device that is newly joining a mobile ad hoc network 10, such as the computing devices of a network node 12 that is newly joining the mobile ad hoc network, can generally be quickly set based upon the GPS time provided by the associated GPS receiver 20 without awaiting for the periodic broadcast of a master clock sync signal. However, although the system time for the computing devices of the various network nodes are set independent of one another, the system time employed by each computing device of the plurality of network nodes is generally synchronized, that is, the same, since each computing device establishes the system time based upon the GPS time provided by the associated GPS receiver and further since the GPS time provided by each GPS receiver should be the same since the GPS time provided by each GPS receiver is derived from the GPS signals provided by the same constellation of GPS satellites. Accordingly, time synchronization can be maintained between the network nodes and, more particularly, between the computing devices of the network nodes of a mobile ad hoc network, while permitting the independent establishment of a system time for each of the network nodes and, more particularly, each of the computing devices within the network nodes of the mobile ad hoc network.

Figure 4:
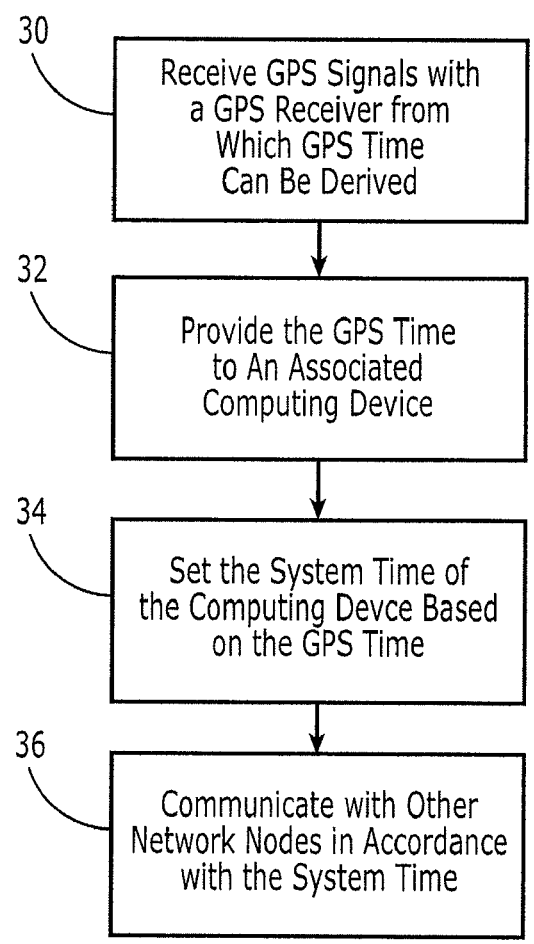
FIG. 4 is a block diagram of the operations performed in accordance with one embodiment of a method of the present invention.

With reference to FIG. 4, the operations for establishing a system time within a mobile ad hoc network 10 are depicted. In this regard, the establishment of a system time includes either of the initial setting of the system time for a computing device 14 that is newly joining the mobile ad hoc network, or the confirmation or re-synchronization of the system time for a computing device that has been and continues to remain a member of a mobile ad hoc network.

In instances in which a network node 12 is in the process of joining a mobile ad hoc network 10 or in instances in which a computing device 14 of a network node that is already a member of a mobile ad hoc network is in the process of joining the network node, a GPS receiver 20 associated with the computing device receives GPS signals. See block 30. The GPS receiver then derives the GPS time from the GPS signals and provides the GPS time to the associated computing device such that the computing device can thereby define a system time. See blocks 32 and 34. For example, the computing device may define the system time to equal the GPS time provided by the GPS receiver or, the computing device may otherwise process the GPS time provided by the GPS receiver in order to define the system time from the GPS time. Thereafter, the computing device may communicate with other computing devices of the network node and/or with computing devices of other network nodes that are members of the same mobile ad hoc network with such communications being conducted in accordance with the system time. See block 36. Even though the system time is determined independently by each computing device of each network node of a mobile ad hoc network, the system time may be common across the mobile ad hoc network and, indeed, between the computing devices of each mobile ad hoc network node since the system time defined by each computing device is based upon the GPS time provided by the respective GPS receivers which, in turn, receive the GPS signals (from which the GPS time is derived) from the same constellation of GPS satellites. By communicating in accordance with the system time, the messages that are transmitted between the computing devices may be time stamped in a manner that is consistent across all of the computing devices as a result of the commonality of the system time. Additionally, the data that is captured by a computing device or provided to a computing device may similarly be time stamped with the system time. In instances in which the data is thereafter provided to another computing device of the mobile ad hoc network, the time stamp associated with the data will also be meaningful and consistent and permit comparison to or analysis with other data collected and similarly time stamped by other computer devices, as a result of the common system time shared by the computing devices.

While the method of embodiments of the present invention may be employed to initially set the system time of a new computing device 14 or new network node 12 joining a mobile ad hoc network 10, so as to avoid the delays associated with a master clock sync signal that is periodically broadcast in conventional ad hoc networks, the method of other embodiments may be employed to reset or synchronize the system time for the computing devices within a mobile ad hoc network. In this regard, a GPS receiver typically receives GPS signals from which the GPS time may be derived on a repeated and regular basis. As such, even after a computing device has initially set its system time and joined a mobile ad hoc network, the GPS receiver can receive additional GPS signals and, in turn, derive the current GPS time. The current GPS time may then be provided by the GPS receiver to the associated computing device which can reset or re-synchronize the system time based upon the current GPS time, such as by setting the system time maintained by its clock 24 to equal the current GPS time. By repeatedly resetting the system time of each computing device of the mobile ad hoc network based upon the GPS signals received by the GPS receivers associated with the respective computing devices, a common system time can be maintained by each of the computing devices of the mobile ad hoc network even though the system time of each computing device is defined independently of the system time of the other computing devices.

Many modifications and other embodiments of the inventions set forth herein will come to mind to one skilled in the art to which these inventions pertain having the benefit of the teachings presented in the foregoing descriptions and the associated drawings. Therefore, it is to be understood that the That which is claimed is:

1. A mobile ad hoc network comprising:
a plurality of mobile ad hoc network nodes configured to communicate with one another, each mobile ad hoc network node comprising:
a transceiver configured to communicate with another network node;
a plurality of computing devices in communication with the transceiver; and
a plurality of Global Positioning System (GPS) receivers associated with respective computing devices, each GPS receiver configured to receive GPS signals and to provide a GPS time derived from the GPS signals to the associated computing device to define a system time,
wherein a respective GPS receiver and the associated computing device of a respective mobile ad hoc network node are configured to independently define the system time based upon the GPS time provided by the respective GPS receiver in a manner that is independent of both the system time of other computing devices within the respective mobile ad hoc network node and the system time of the computing devices within other mobile ad hoc network nodes.

2. The mobile ad hoc network according to claim 1 wherein the mobile ad hoc network nodes are configured to randomly join and leave the mobile ad hoc network without a predefined network configuration.

3. The mobile ad hoc network according to claim 2 wherein the computing device of a mobile ad hoc network node is configured to define the system time based upon the GPS time provided by the respective GPS receiver prior to joining the mobile ad hoc network.

4. The mobile ad hoc network according to claim 1 wherein at least one mobile ad hoc network node further comprises a router for facilitating communications between the at least one computing device and the transceiver.

5. The mobile ad hoc network according to claim 4 wherein the router and the at least one computing device are configured to communicate in accordance with internet protocol.

6. The mobile ad hoc network according to claim 1 wherein the transceiver of each mobile ad hoc network node is configured to communicate wirelessly with other mobile ad hoc network nodes, and wherein the transceiver and the at least one computing device of each mobile ad hoc network node are configured to communicate via wired communication.

7. A mobile ad hoc network node comprising:
a transceiver configured to communicate with another mobile ad hoc network node;
a plurality of computing devices in communication with the transceiver; and
a plurality of Global Positioning System (GPS) receivers associated with respective computing devices, each GPS receiver configured to receive GPS signals and to provide a GPS time derived from the GPS signals to the associated computing device to define a system time,
wherein a respective GPS receiver and the associated computing device of the mobile ad hoc network node are configured to independently define the system time based upon the GPS time provided by the respective GPS receiver in a manner that is independent of the system time of other computing devices within the mobile ad hoc network node, and
wherein the associated computing device is configured to communicate via the transceiver with other mobile ad hoc network nodes in accordance with the system time that is both common between the mobile ad hoc network nodes and also based upon the GPS time provided by the respective GPS receiver.

8. The mobile ad hoc network node according to claim 7 wherein the at least one computing device is configured to define the system time based upon the GPS time provided by the respective GPS receiver prior to commencing communications with another mobile ad hoc network node.

9. The mobile ad hoc network node according to claim 7 further comprising a router for facilitating communications between the at least one computing device and the transceiver.

10. The mobile ad hoc network node according to claim 9 wherein the router and the at least one computing device are configured to communicated in accordance with internet protocol.

11. The mobile ad hoc network node according to claim 7 wherein the transceiver is configured to communicate wirelessly with other mobile ad hoc network nodes, and wherein the transceiver and the at least one computing device are configured to communicate via wired communication.

12. A method for establishing a system time within a mobile ad hoc network comprising a plurality of mobile ad hoc network nodes that each include a plurality of computing devices and a plurality of Global Positioning System (GPS) receivers associated with respective computing devices, the method comprising:
receiving GPS signals with a first GPS receiver associated with a first computing device of a first mobile ad hoc network node;
providing a GPS time derived from the GPS signals to the associated first computing device to thereby define a system time, wherein the first GPS receiver and the associated first computing device of the first mobile ad hoc network node are configured to independently define the system time based upon the GPS time provided by the first GPS receiver in a manner that is independent of the system time of other computing devices within the first mobile ad hoc network node; and
permitting communication between the first computing device of the first mobile ad hoc network node and other mobile ad hoc network nodes in accordance with a system time that is both common between the mobile ad hoc network nodes and also based upon the GPS time provided by the respective first GPS receiver.

13. The method according to claim 12 further comprising permitting the mobile ad hoc network nodes to randomly join and leave the mobile ad hoc network without a predefined network configuration.

14. The method according to claim 13 further comprising defining the system time with the computing device of a mobile ad hoc network node based upon the GPS time provided by the respective GPS receiver prior to the respective mobile ad hoc network node joining the mobile ad hoc network.

15. The method according to claim 12 further comprising independently defining a respective system time for each of a plurality of computing devices of the first mobile ad hoc network node based upon the GPS time provided by respective GPS receivers.

16. The method according to claim 12 further comprising facilitating communications with the at least one computing device with a router.

17. The method according to claim 16 wherein facilitating communication comprises permitting communication between the router and the at least one computing device in accordance with internet protocol.

18. A method according to claim 12 wherein permitting communication comprises providing for wireless communication between the first computing device of the first mobile ad hoc network node and other mobile ad hoc network nodes, and wherein the method further comprises providing wired communication between the plurality of computing devices within the first mobile ad hoc network node.

* * * * *